United States Patent [19]
Samuelson et al.

[11] Patent Number: 5,477,685
[45] Date of Patent: Dec. 26, 1995

[54] LEAN BURN INJECTOR FOR GAS TURBINE COMBUSTOR

[75] Inventors: Scott Samuelson; William Sowa; Scott Shaffer, all of Irvine, Calif.

[73] Assignee: The Regents of the University of California, Oakland, Calif.

[21] Appl. No.: 152,261

[22] Filed: Nov. 12, 1993

[51] Int. Cl.$^6$ .................................................. F23R 3/32
[52] U.S. Cl. .............................. 60/737; 239/406; 239/425
[58] Field of Search .......................... 60/737, 738, 740, 60/742, 748; 239/427.3, 419, 425, 405, 406

[56] References Cited

U.S. PATENT DOCUMENTS

| | | | |
|---|---|---|---|
| Re. 33,464 | 11/1990 | Gitman | 239/425 |
| 3,267,676 | 8/1966 | Sneeden | 60/738 |
| 3,564,847 | 2/1971 | Wagner | 60/738 |
| 3,713,588 | 1/1973 | Sharpe | 60/742 |
| 3,989,444 | 11/1976 | Staudinger | 239/425 |
| 4,023,351 | 5/1977 | Beyler et al. | 60/742 |
| 4,260,367 | 4/1981 | Markowski et al. | 60/742 |
| 4,598,553 | 7/1986 | Saito et al. | 60/737 |
| 4,600,151 | 7/1986 | Bradley | 239/406 |
| 5,101,533 | 4/1992 | Keller et al. | 60/737 |

OTHER PUBLICATIONS

Alkabie, H. S. et al., "Ultra Low $NO_x$ Emissions for Gas and Liquid Fuels Using", 1989 Gas Turbine and Aeroengine Congress and Exposition, Jun. 4–8, 1989 Toronto, Canada, ASME Paper 89–GT–322.
Cowell, L. H. et al., "Development of a Liquid–Fueled, Lean–Premixed Gas Turbine Combustor", 1992 International Gas Turbine and Aeroengine Congress and Exposition, Cologne, Germany, Jun. 1–4, 1992 ASME Paper 92–GT–112.
McVey, J. B., et al. "Evaluation of Low $NO_x$ Combustor Concepts for Aeroderivative Gas Turbine Engines", 1992 International Gas Turbine and Aeroengine Congress and Exposition, Cologne, Germany, Jun. 1–4, 1992 ASME Paper 92–GT–133.
Smith, Kenneth O., "Engine Testing of a Prototype Low $NO_x$ Gas Turbine Combustor", 1992 International Gas Turbine and Aeroengine Congress and Exposition Jun. 1–4, 1992 Cologne, Germany, ASME Paper 92–GT–116.

Primary Examiner—Timothy S. Thorpe
Attorney, Agent, or Firm—Knobbe Martens Olson & Bear

[57] ABSTRACT

The invention relates to a plain jet radial injection fuel nozzle for a gas turbine combustor. The nozzle includes an axially elongate middle tube having a desired diameter. The middle tube is adapted for fuel flow. A fuel exit passage is located circumferentially around the middle tube near its distal end. An axially elongate inner adapted for flow of air or gaseous fuel is inside the middle tube. An axially elongate outer tube is also adapted for flow of air or gaseous fuel. The outer tube is located outisde the middle tube, so as to create a space between the middle tube and the outer tube where fuel flowing through the middle tube and air flowing through the inner and outer tubes can mix to form a fuel/air mixture. The nozzle has an endcap at the distal end of the outer tube. The endcap includes a fuel/air exit passage that permits the fuel/air mixture to exit the nozzle. The nozzle can be adapted to attach to a quarl for providing a fuel/air mixture to a gas turbine combustor.

42 Claims, 3 Drawing Sheets

FIG. 1

FIG. 4 NOx RESULTS

FIG. 5 NOx RESULTS AS A FUNCTION OF ADIABATIC FLAME TEMPERATURE

LEAN BURN INJECTOR FOR GAS TURBINE COMBUSTOR

GOVERNMENT SUPPORT

This invention was made with U.S. Government support under Grant No. NAG3-1124 awarded by the National Aeronautics and Space Administration. The Government has certain rights in this invention.

FIELD OF THE INVENTION

The present invention relates to an improvement in gas turbine combustors. More specifically, the invention relates to a nozzle and venturi-shaped dome geometry, in which fuel is sprayed in a radial direction, perpendicular to the airflow through the combustor.

BACKGROUND OF THE INVENTION

One of the greatest challenges in gas turbine design is the reduction of pollutant emissions. Among the most troublesome emissions from gas turbines are the oxides of nitrogen (NOx), which are known to have deleterious effects on the Earth's ozone layer. NOx emissions are also known contributors to acid rain and photochemical smog.

Gas turbines are being used in an increasing variety of applications, in part because of their high power-to-weight ratio, and their high energy efficiency. Thus, the need to reduce NOx emissions is becoming particularly acute. Emissions from ground-based gas turbines contribute to photochemical smog; emissions from conventional commercial and military aircraft contribute to the formation of acid rain. Most notably, the next generation of high-speed civil transport (HSCT) aircraft will fly in the stratosphere, directly affecting the Earth's ozone layer.

One of the prominent mechanisms for the creation of NOx in combustion reactions is known as "thermal NOx." In this process, the high thermal energy of the combustion reaction breaks the bonds of $N_2$ molecules, forming NO and free N atoms. The free N atoms then combine with oxygen to produce further NO. In 1946, Zeldovich proposed a kinetic mechanism for the formation of thermal NO. The reaction can be described as follows:

$$N_2 + \rightleftharpoons NO + N$$

$$N + O_2 \rightleftharpoons NO + O$$

The rate of NO formation in the Zeldovich mechanism is as follows:

$$\frac{d[NO]}{dt} = 2k_f e^{-\frac{E}{RT}} [NO][O]$$

where $k_f$ is the forward rate constant of the reaction $$N_2 + O \rightarrow NO + N;$$

$$e^{-\frac{E}{RT}}$$

is the Boltzman Factor; R is the universal gas constant, 1.987 cal/K.gm.mol, T is the temperature, and E is the activation energy, measured in cal/mol. The forward rate constant has been empirically identified as $7 \cdot 10^{13}$ and the activation energy is 75,000 cal/mol; therefore, thermal NO formation is extremely temperature dependent. Above a critical temperature of approximately 1900K, the production of NO dramatically increases. Therefore, decreasing the temperature of the combustion reaction is an effective method of reducing NOx emissions.

Notably, the next generation of high-speed civil transport (HSCT) aircraft, currently under development, are expected to operate with combustion reactions in excess of this critical temperature. However, because NO production increases exponentially with increasing temperature, reducing the variance of combustion temperature is also an effective method for reducing NOx emissions. It can readily be seen from the foregoing discussion that a small upward fluctuation in combustion temperature can dramatically increase NO production, but that a corresponding downward fluctuation will only slightly decrease NO production.

The reaction temperature in combustion systems is a function of the relative amounts of fuel and oxidant (typically air) used. The fuel-to-air ratio is said to be stoichiometric when the mixture, in theory, gives complete combustion, without any excess oxygen. It is well known in the art that when the fuel-to-air mixture is nearly stoichiometric, the reaction temperature is at its greatest. Therefore, some combustor designs burn "lean" or "rich"—that is, they utilize a fuel-to-air ratio that is either substantially less than, or substantially greater than, stoichiometric—in order to reduce NOx emissions.

Because of the exponential relationship between reaction temperature and NOx emissions, it is also understood in the art that complete mixing of the fuel and air prior to reaction is desirable. Proper mixing of the fuel and air prevents the formation of "pockets" having different fuel-to-air ratios. These pockets cause fluctuations in the overall reaction temperature, resulting in an increase in NOx emissions.

Conventional gas turbines typically inject fuel and air separately into the reaction zone. As a result, the fuel and air are not completely mixed prior to reaction. It is known in the art to provide a lean burn, direct-injected ("LDI") gas turbine combustor in which fuel and air are rapidly mixed prior to reaction at a lean mixture ratio.

SUMMARY OF THE INVENTION

In one aspect, the present invention is a plain jet radial injection fuel injector for a gas turbine combustor. The injector has a nozzle and a quarl.

The nozzle has an axially elongate middle tube through which fuel flows. A fuel exit passage is located circumferentially around the middle tube near its distal end. The fuel exit passage permits the exit of fuel from the middle tube in a generally radial direction away from the middle tube, and can consist of a plurality of fuel exit holes spaced around the circumference of the middle tube. The fuel exit holes can be located on a ring surrounding the middle tube. The fuel exit holes are preferably between 0.1 mm and 3 mm in diameter, and there are preferably four to eight of them, spaced evenly apart.

An axially elongate inner tube, adapted for the flow of either air or gaseous fuel, is located inside the middle tube. An axially elongate outer tube, also adapted for the flow of either air or gaseous fuel, is located outside of, and surrounding, the middle tube. The inner tube is typically between 2 mm and 20 mm in outside diameter. The middle tube is typically between 1.25 and 4.0 times the diameter of the inner tube; and the outer tube is typically between 1.25 and 4.0 times the diameter of the middle tube.

An endcap is located at the distal end of the outer tube. The endcap has a fuel/air exit passage that permits the fuel/air mixture from the inner, middle, and outer tubes to exit the nozzle in a generally radial direction away from the endcap. The fuel/air exit passage can be a plurality of fuel/air exit holes, spaced around the circumference of the endcap. These fuel/air exit holes are preferably between 1 mm and 10 mm in diameter, and there are preferably four to eight of them, spaced evenly apart. Preferably, the endcap has a dome-shaped distal end, and can be an integral part of the outer tube.

In another aspect, the present invention provides a quarl. The quarl can be adapted to surround the nozzle. The quarl has a fuel and air mixing chamber with a venturi internal shape, which is adapted to receive the fuel/air mixture from the nozzle. The quarl also has a diverging section, separated from the mixing chamber by the throat formed by the venturi shape of the quarl. The throat of the quarl can have a rounded edge. The nozzle can be held concentrically within the quarl, and can be located within the mixing chamber of the quarl.

The mixing chamber is in a converging section of the quarl, which typically has a converging angle of between 10° and 60° from the centerline of the quarl. The diverging section of the quarl typically has a diverging angle of between 30° and 80° from the centerline of the quarl.

The quarl can further incorporate a gas swirler, adapted to swirl the fuel/air mixture within the quarl. The swirler will typically have a swirl number between 0.6 and 2.0.

Still another aspect of the present invention relates to a method of providing fuel to a gas turbine combustor using a nozzle of the type having an axially elongate inner tube, an axially elongate middle tube, and an axially elongate outer tube. In the nozzle used in this method, the tubes are arranged in concentric fashion such that the inner tube is inside the middle tube and the middle tube is inside the outer tube, with each of the tubes having a distal end and a proximal end. At the distal end of the outer tube, there is an end cap that has a fuel/air exit passage. The method includes the step of providing fuel through the middle tube, such that the tube exits the middle tube near its distal end. Thereafter, air is provided through each of the inner and outer tubes, such that the air mixes with the fuel exiting the middle tube to create a fuel/air mixture. The fuel/air mixture is permitted to exit the nozzle through the fuel/air exit passage. In a preferred embodiment, the fuel exits the middle tube in a direction perpendicular to the axis of the outer tube. In this embodiment, the air flows along the axis. Preferably, the fuel/air mixture exits the nozzle also in a direction perpendicular to the axis. In a particularly preferred embodiment, the method makes use of a nozzle attached to a quarl of the type having a mixing chamber separated from a diverging section by a throat. In this particularly preferred embodiment, the method includes the step of providing the fuel/air mixture exiting from the fuel/air exit passage to the mixing chamber. Thereafter, the fuel/air mixture is provided across the throat to the diverging section. The fuel/air mixture can be swirled in the mixing chamber.

INTRODUCTION TO THE PREFERRED EMBODIMENT

Traditionally, a combustor's performance has primarily been judged by its energy efficiency and durability. That view, however, is quickly changing due to environmental issues and regulations. Today, the performance of a gas turbine combustor is also judged by its level of pollutant emissions.

Aircraft combustors receive special attention because of their proximity to the Earth's ozone layer, and because their emissions directly contribute to acid rain formation. Norway, for example, imposes an "acid rain" tax on aircraft crossing its airspace, based on the quantity of NOx emissions generated by the aircraft's engines. Additionally, the United States, in developing the next generation of high-speed civil transport (HSCT) aircraft, has set a goal of reducing NOx emissions from conventional gas turbine combustors by ten-fold.

Aircraft turbine combustors also play a strong role in contributing to the length, and therefore weight, of the engine. Conventional gas turbine combustors have three main zones: the primary zone, immediately downstream of the combustor, where hot reaction products recirculate into contact with fresh reactants; the secondary zone, where carbon monoxide (CO) from the primary zone is oxidized to form carbon dioxide ($CO_2$); and the dilution zone, where air is added to the products of the secondary zone to reduce the temperature at the exit of the combustor. The number and size of these zones leads to longer combustors, which increase the overall length and weight of the engine.

The preferred embodiment addresses both of these concerns, emissions and weight, simultaneously. In the present invention, only two zones are required: a mixing zone, where an already atomized fuel mist is allowed to completely mix with the combustor airflow; and a reaction zone, where the fuel/air mixture reacts and exits the combustor. Because in a lean burn system all of the air enters the reaction zone directly, there is no need for a dilution zone in which more air would be added to reduce the temperature of the exiting reaction products. In addition, complete mixing of the fuel and air prevents the formation of "pockets" where the fuel-to-air ratio approaches stoichiometric. These pockets would burn at a higher temperature, increasing overall NOx emissions, and possibly resulting in unburned fuel and carbon soot. Thus, the present invention reduces both the length (and weight) of the combustor, and its overall emissions, especially NOx.

The present invention relates to a gas turbine combustor having an improved nozzle and dome geometry. The combustor includes an airblast nozzle having a tube-in-tube-in-tube configuration terminating in an endcap. Fuel flowing through the middle tube, and air flowing through the inner and outer tubes, mix within the endcap, atomizing the fuel. The fuel/air mixture then exits the nozzle in a generally radial direction, perpendicular to the airflow of the combustor. The combustor dome geometry has a mixing zone, wherein the combustor airflow and the fuel/air mixture from the nozzle mix to form an overall lean ratio of fuel to air; and a reaction zone, wherein the lean mixture combusts. The dome geometry achieves pressure gradient separation of the mixing and reaction zones through the use of a venturi, further enhancing complete mixing of fuel and air before reaction, which in turn reduces pollutant emissions from the combustor. Additionally, the combustor includes a swirler surrounding the nozzle, which provides better mixing of the air and fuel, and causes recirculation in the reaction zone which provides a smoother, more continuous reaction.

Figure 4:
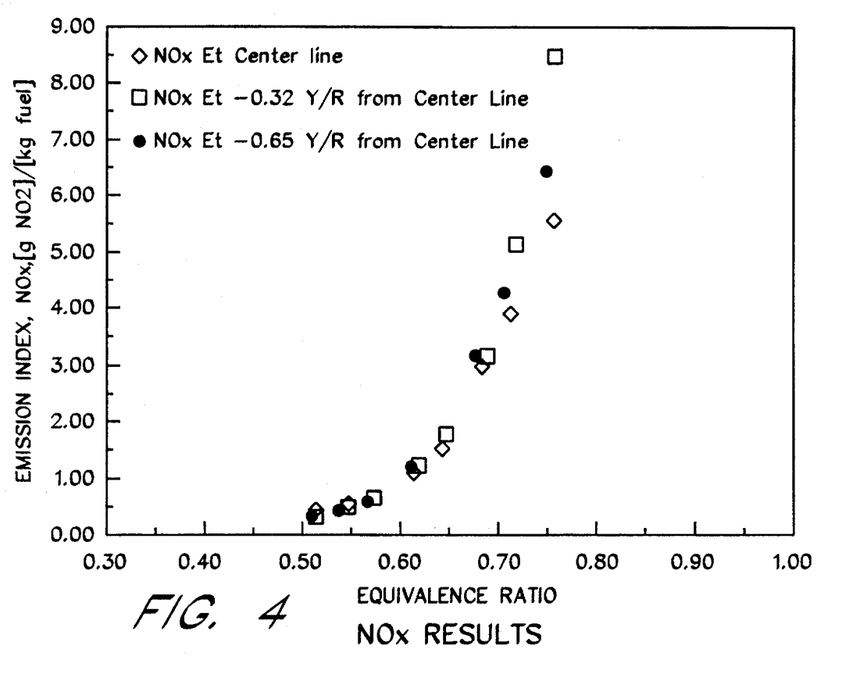
FIG. 4 is a chart showing the emissions index of the preferred embodiment of the present invention, as a function of equivalence ratio.
Figure 5:
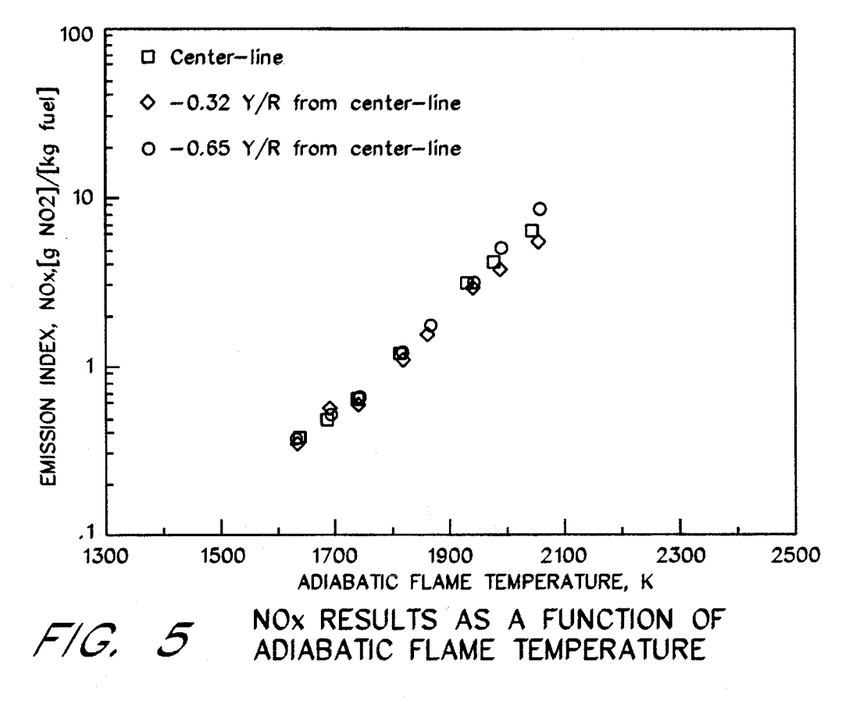
FIG. 5 is a chart showing the emissions index of the preferred embodiment of the present invention, as a function of adiabatic flame temperature.

FIGS. 4 and 5 illustrate test results obtained using the preferred embodiment of the present invention. The tests were conducted at atmospheric pressure, at varying ratios of fuel to air. Similar results have been demonstrated at the pressures encountered by operating aircraft.

FIG. 4 shows NOx emissions in terms of grams of $NO_2$/kilogram per fuel as a function of equivalence ratio. Readings were taken at the centerline and at distances 0.32 Y/R from the centerline and 0.65 Y/R from the centerline. It can be seen that at equivalence ratios above 0.70 that NOx emissions increase dramatically, and that equivalence ratios below 0.60 produce relatively low NOx emission indices.

FIG. 5 shows NOx results as a logarithmic function of adiabatic flame temperature, with data points taken at the same points with respect to the centerline as in FIG. 4. It can be seen that at temperatures above approximately 1700° K. that NOx emissions increase exponentially.

Tests have also revealed that a combustor of the present invention has high combustion efficiency, which is to be expected because of the thorough mixing of fuel and air the present invention provides. In addition, the present invention has good stability limits: when operated at lean conditions, the lean blow out (LBO) limit—the point at which the ratio of fuel to air is insufficient to sustain a reaction—is between an equivalence ratio of 0.40 and 0.45. Visual data also indicate that the present invention is generally free from pulsation and other combustion-induced instabilities, and can be safely operated at very lean conditions. As noted above in the Background, operating at lean conditions is an effective method of reducing overall NOx emissions.

Although the description of the preferred embodiment speaks in terms of an atomized fuel mist, implying a liquid-fueled combustor, the present invention is directed to both gaseous-fueled and liquid-fueled gas turbine combustors. In addition, the present invention can be used in dual-fueled applications, or in liquid-fueled applications where simplex injectors replace the airblast injector of the preferred embodiment.

DETAILED DESCRIPTION OF THE PREFERRED EMBODIMENT

Figure 1:
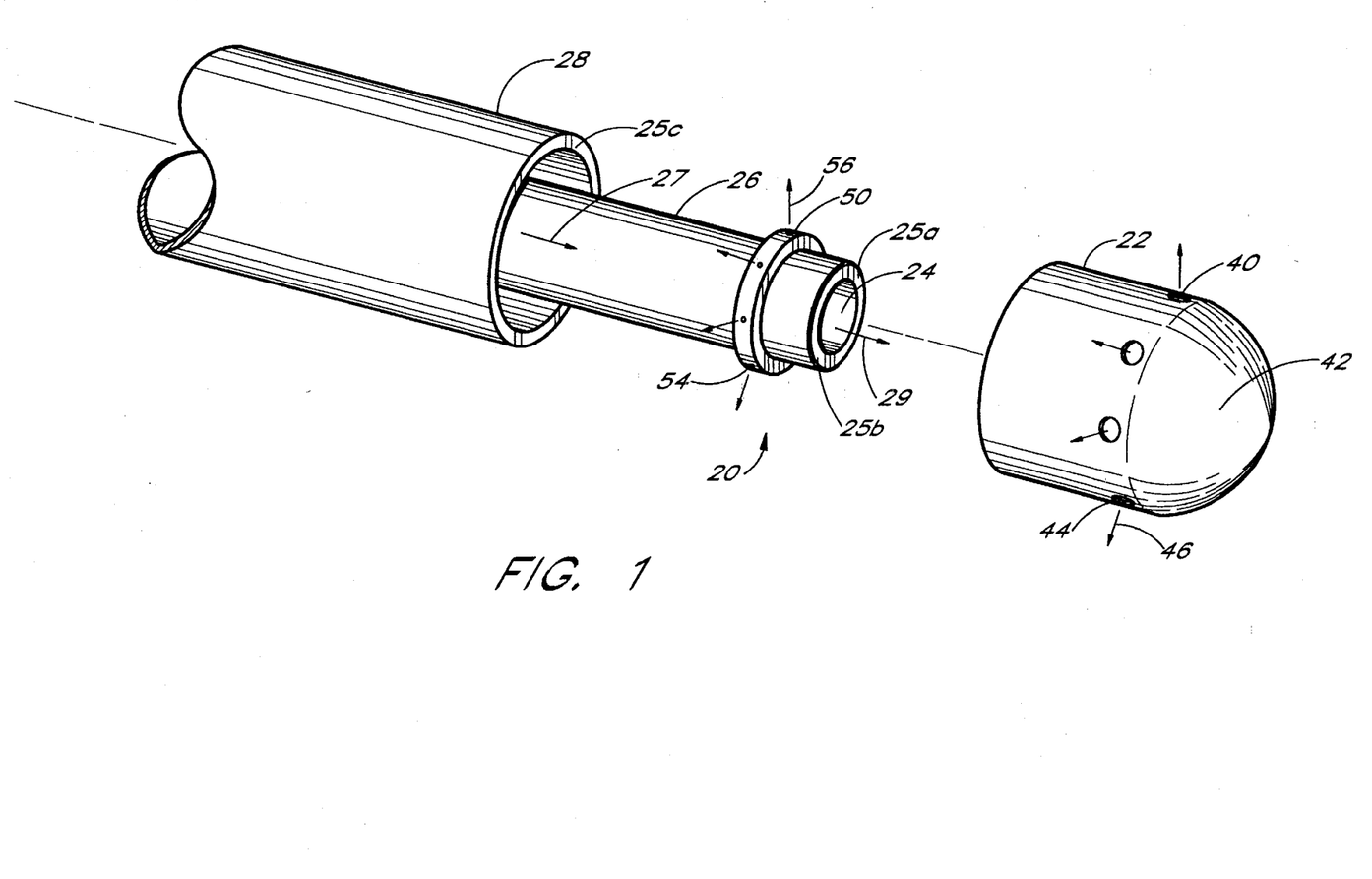
FIG. 1 is a an exploded perspective view of a fuel nozzle of the present invention, as viewed from the front side, illustrating the tube-in-tube configuration and the nozzle head.
Figures 2, 3:
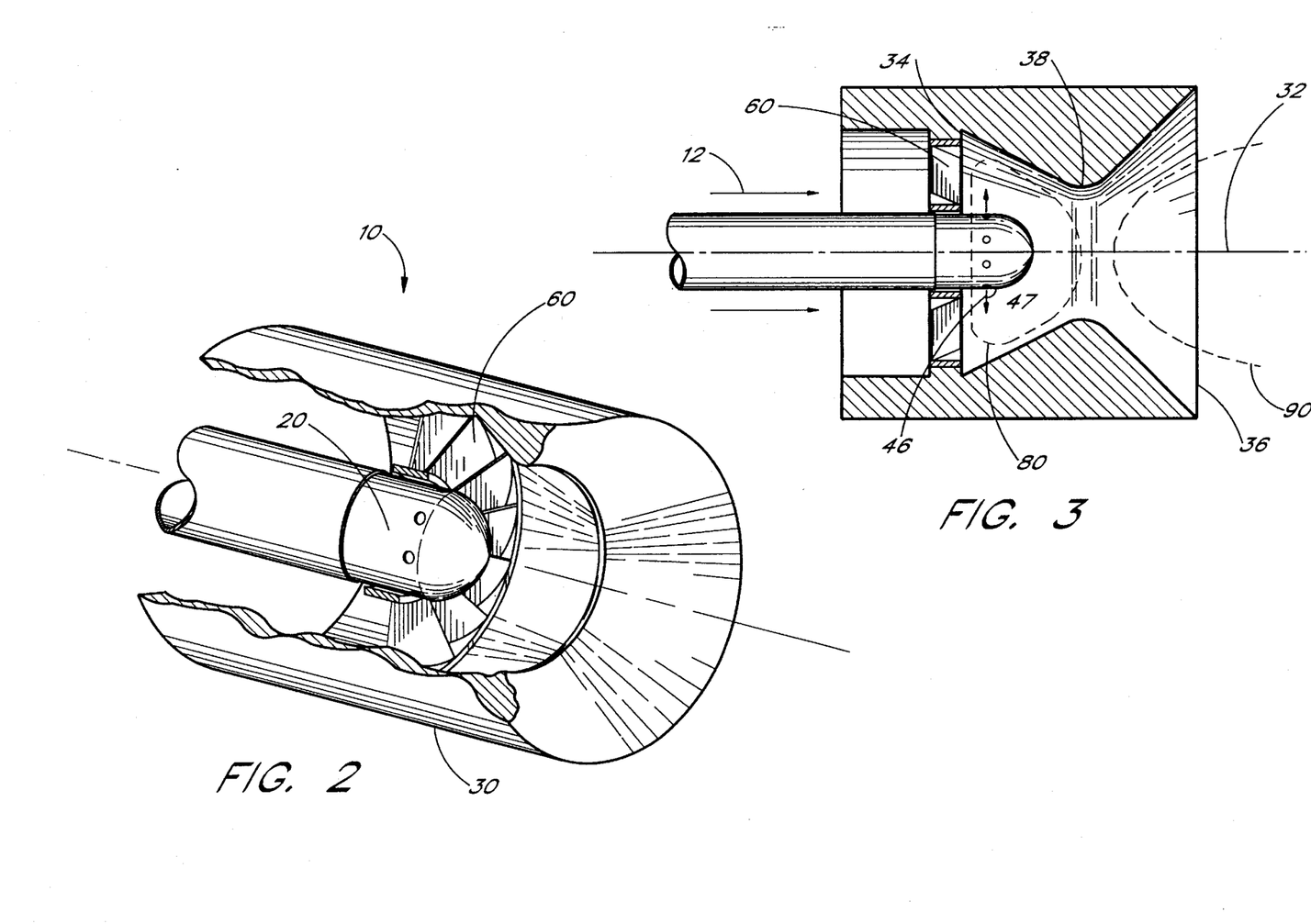
FIG. 2 is a cut-away perspective view of a fuel nozzle and quarl of the present invention, as viewed from the front side, illustrating the relative positions of the fuel nozzle and quarl.
FIG. 3 is a side view of the fuel nozzle and quarl of FIG. 2, showing the geometry of the quarl interior and the position of swirl vanes at the base of the quarl.

FIG. 1 is an exploded assembly view of a nozzle 20 used in a fuel injector 10 of the present invention. FIG. 2 illustrates the nozzle 20 in its place within the fuel injector 10. In general, the fuel injector 10 comprises a nozzle 20 and a quarl 30. All of the parts of the fuel injector 10 are constructed of any hard, durable, heat- and corrosion-resistant material, preferably stainless steel, and most preferably an exotic high temperature alloy such as Inconel.

FIG. 2 describes the nozzle 20 in greater detail. In particular, the nozzle 20 has an endcap 22, an inner air tube 24, a middle fuel tube 26, and an outer air tube 28.

The endcap 22 has a fuel/air exit passage 40, shown in FIG. 1 as a plurality of fuel/air exit holes 44 disposed circumferentially near the end 42 of the endcap 22. There are preferably eight such fuel/air exit holes 44, spaced radially evenly apart; but any number or configuration of fuel/air exit holes 44, and indeed many other configurations of the general fuel/air exit passage 40, such as a gap or slot, are possible and contemplated by the present inventor. The fuel/air exit passage 40 is preferably designed to evenly distribute the exiting fuel/air mixture 46, and to minimize the pressure drop across the nozzle 20. In addition, the cross-sectional area of the fuel/air exit passage 40 should be large enough to prevent a high air pressure drop; yet remain small enough that the exit velocity is sufficient to effectively atomize the flow of fuel 56 from the fuel exit passage 50. In the preferred embodiment, the eight exit holes 40 are between 1 mm and 5 mm in diameter, and most preferably about 2 mm in diameter.

The end 42 of the endcap 22 is shown in the preferred embodiment as spherically rounded, although other shapes are contemplated by the present inventor. The end 42 limits the flow of air 29 through the inner air tube 24, forcing the air 29 to circulate back toward the fuel/air exit passage 40. In addition, the end 42 can receive radiated heat energy from the reaction zone 90, and can transmit this energy to the flow of air 29 from inner air tube 24; the hotter air 29 can more effectively atomize the flow of fuel 56 from the fuel exit passage 50. Likewise, the flow of air 29 from the inner air tube 24 cools the end 42 of the endcap 22, preventing thermal breakdown of the endcap 22.

The fuel/air exit passage 40 is located at any point along the endcap 22, and preferably is aligned with the fuel exit passage 50. The fuel/air exit passage 40 is disposed such that the injection angle 47 of the fuel/air mixture 46 is substantially perpendicular to the combustor air flow 12, although other injection angles, both with and against the combustor air flow 12, are contemplated by the inventor herein.

The endcap 22 can be joined to the outer air tube 28 through such means as are well known in the art, for example by screw threading or welding; or, and most preferably, it can be an integral part of the outer air tube 28. In either case, the outside diameter (O.D.) of the endcap 22 is preferably approximately equal to the O.D. of the outside air tube 28, in this case about 25 mm.

The inner air tube 24 carries air 29 into the endcap 22. Alternatively, in a gaseous-fueled or dual-fueled application, the inner air tube 24 would carry gaseous fuel instead of air. Preferably, the inner air tube 24 is between 3 mm and 13 mm in O.D., and is most preferably about 6.35 mm in O.D. The end 25a of the inner air tube 24 is spaced apart from the end 42 of the endcap 22, allowing the airflow 29 to circulate back around the end 42 of the endcap 22 and exit through the fuel/air exit passage 40.

The middle fuel tube 26 is annular, and terminates in a fuel exit passage 50 located near the end 25b of the middle fuel tube 26. The O.D. of the middle fuel tube 26 is preferably between 1.25 and 4.0 times that of the inner air tube 24, and is most preferably about twice the O.D. of the inner air tube 24, or 12.7 mm in the preferred embodiment. The O.D. of the middle fuel tube 26 should be selected so that the annular cross section of the middle fuel tube 26 is adequate to carry the flow of fuel 56.

The fuel exit passage 50 of the preferred embodiment is shown in FIG. 1 as a plurality of fuel exit holes 54, disposed circumferentially around the middle fuel tube 26. There are preferably eight such fuel exit holes 54, spaced evenly radially apart; but any number or configuration of fuel exit holes 54, and indeed many other configurations of the general fuel exit passage 50, such as a gap or slot, are possible and contemplated by the present inventor. The fuel exit passage 50 is preferably designed to evenly distribute the exiting fuel flow 56. The total cross-sectional area of the fuel exit passage 50 is relatively unimportant, however, because the velocity of airflows 27 and 29 are much greater than the velocity of the fuel flow 56, and thus changes in fuel flow 56 velocity have only minimal effect on atomization of the fuel 56. In the preferred embodiment, the eight exit holes 40 are between 0.1 mm and 3 mm in diameter, and most preferably about 0.3 mm in diameter.

The outer air tube 28 carries air 27 into the endcap 22. Alternatively, in a gaseous-fueled or dual-fueled application, the outer air tube 28 would carry gaseous fuel instead of air. Preferably, the outer air tube 28 has an O.D. between 1.25 and 4.0 times that of the middle fuel tube 26, and is most preferably about twice the O.D. of the middle fuel tube 26, or 25 mm in the preferred embodiment. The end 25c of the outer air tube 28 sealably connects, through such means as are well known in the art, with the endcap 22, and is in the preferred embodiment an integral unit with the endcap 22.

The inner air tube 24, middle fuel tube 26, and outer air tube 28 should be located substantially concentrically in order to cause even distribution of fuel and air within the endcap 22 of the nozzle 20. The tubes 24, 26, 28 can be held in this concentric alignment by such means as are well known in the art.

The quarl 30 forms a partial enclosure around the nozzle 20, and shapes the combustor airflow 12 around the nozzle 20, so as to optimize mixing of the exiting air fuel mixture 46 in the mixing zone 80, and to create a positive pressure gradient separating the mixing zone 80 from the reaction zone 90. Pressure gradient separation of the mixing zone 80 and the reaction zone 90 enables optimum mixing of the exiting fuel/air mixture 46 within the mixing zone. Pressure gradient separation also prevents recirculation of hot reaction products from the reaction zone 90 into the mixing zone 80, where these reaction products might prematurely combust the exiting fuel/air mixture 46. Preferably, as shown in FIG. 3, the quarl is shaped in a classical venturi shape, having a radial axis 32, an open proximal end 34, and an open distal end 36, and having a throat 38 such that the inner radius of the proximal 34 and distal 36 ends is greater than the inner radius of the throat 38. However, other shapes that accomplish pressure gradient separation of the mixing zone 80 and reaction zone 90 for different flow regimes of the combustor airflow 12 are possible, and are contemplated by the inventor herein.

In the preferred embodiment, the quarl 30 distal end 36 has an exit diameter of between 1.67 and 4.0 times that of the outer air tube 28 O.D., and most preferably is three times the outer air tube 28 O.D., or 76 mm. The quarl 30 throat 38 should have an inside diameter of between one-fourth and three-fourths distal end 36 exit diameter, and most preferably is one-half the distal end 36 exit diameter, or about 38 mm. The quarl 30 should have a contraction angle from the proximal end 34 to the throat 38 of between 10° and 60°, and most preferably 18°; and an expansion angle from the throat 38 to the distal end 36 of between 30° and 80°, and most preferably 45°. In the preferred embodiment, these angles result in a proximal end 34 inside diameter of about 64 mm.

The quarl 30 can be of any length. However, because longer residence times of the exiting fuel/air mixture 46 within the mixing zone 80 of the quarl 30 can lead to autoignition, in the preferred embodiment the quarl length is between one-fourth to twice the distal end 36 exit diameter, and most preferably about 0.75 times the distal end 36 exit diameter, or about 57 mm long.

In the preferred embodiment, the quarl 30 includes a swirler 60 at its proximal end 34. The swirler 60 "swirl stabilizes" the flow of combustor air 12 through the quarl 30, enhancing the continuity of combustion in the reaction zone. Swirlers are measured by their "swirl number," which is equal to the ratio of the axial flux of swirl momentum divided by the axial flux of the axial momentum of the gas flow exiting from the swirler. At swirl numbers greater than 0.6, strong radial and axial pressure gradients result in axial recirculation, bringing hot products back into contact with fresh reactants and maintaining a continuous reaction. The swirler 60 preferably has a swirl number between about 0.6 and 2.0; the swirler 60 used in the preferred embodiment is an axial swirler with flat vanes, a vane angle of 60°, and a swirl number of 1.52. The swirler 60 can have any outside diameter less than or equal to the inner diameter of the proximal end 34 of the quarl 30. In the preferred embodiment, in order to minimize separation of the combustor airflow 12 from the proximal end 34 of the quarl 30, the swirler 60 has an outside diameter equal to the inside diameter of the proximal end 34 of the quarl 30, approximately 64 mm. Similarly, the swirler 60 can have any inside diameter greater than or equal to the outside diameter of the nozzle 20; and in the preferred embodiment, again for the purpose of minimizing separation of the combustor airflow 12 from the proximal end 34 of the quarl 30, the swirler 60 has an inside diameter equal to the O.D. of the nozzle 20, approximately 25 mm.

The nozzle 20 is disposed concentrically within the mixing zone 80 of the quarl 30, and laterally such that the fuel/air exit passage 40 of the endcap 22 is within the mixing zone 80. The nozzle 20 can be held in position by any mechanism known in the art, and in the preferred embodiment it is retained by a slip fit within the inner hub of the swirler 60.

We claim:

1. A plain jet radial injection fuel nozzle for a gas turbine combustor, comprising:

an axially elongate middle tube having a distal end and a proximal end, said middle tube being adapted for flow of fuel therethrough;

a fuel exit passage located circumferentially around the middle tube near the distal end thereof;

an axially elongate inner tube having a proximal end and a distal end, said inner tube being adapted for flow of air or gaseous fuel therethrough, said inner tube located inside said middle tube;

an axially elongate outer tube adapted for flow of air or gaseous fuel therethrough, said outer tube having a distal end and a proximal end, said middle tube located inside said outer tube, so as to create a space between said middle tube and said outer tube where fuel flowing through said middle tube and air flowing through said inner and outer tubes can mix to form a fuel/air mixture; and an endcap located on the distal end of said outer tube, said endcap including a fuel/air exit passage that permits said fuel/air mixture to exit said nozzle, said endcap structured to reverse the air flow from the inner tube to oppose the air flow from the outer tube, thereby creating shear forces that atomize fuel flow from the middle tube.

2. The nozzle of claim 1, wherein said fuel exit passage permits the exit of fuel from said middle tube in a generally radial direction away from said middle tube.

3. The nozzle of claim 1, wherein said inner tube has a circular cross-section with an outside diameter in the range of about 2 mm to about 20 mm.

4. The nozzle of claim 1, wherein said middle tube has a circular cross-section with an outside diameter in the range of about 1.25 to 4.0 times that of said inner tube.

5. The nozzle of claim 1, wherein said outer tube has a circular cross-section with an outside diameter in the range of about 1.25 to 4.0 times that of said middle tube.

6. The nozzle of claim 1, wherein said fuel exit passage comprises a plurality of fuel exit holes.

7. The nozzle of claim 6, additionally comprising a fuel exit hole ring on said middle tube on which said fuel exit holes are located.

8. The nozzle of claim 6, wherein said fuel exit holes are circular and have a diameter in the range 0.1 mm to 3 mm.

9. The nozzle of claim 1, wherein said fuel/air exit passage comprises a plurality of fuel/air exit holes.

10. The nozzle of claim 9, wherein said fuel/air exit holes are circular and have a diameter in the range of about 1 mm to about 10 mm.

11. The nozzle of claim 1, wherein said endcap is integral with said outer tube.

12. The nozzle of claim 1, wherein said endcap has a dome-shaped distal end.

13. The nozzle of claim 6, comprising at least four fuel exit holes.

14. The nozzle of claim 9, comprising at least four fuel/air exit holes.

15. The nozzle of claim 9, wherein said fuel/air exit holes are located circumferentially around said endcap, near the distal end of said endcap.

16. The nozzle of claim 1, wherein said fuel/air exit passage permits the exit of said fuel/air mixture from said endcap in a generally radial direction away from said endcap.

17. A quarl for providing a fuel/air mixture to a gas turbine combustor, comprising:
 a nozzle holder adapted for attachment of a fuel nozzle that supplies said fuel/air mixture;
 a fuel and air mixing chamber with a venturi internal shape, said mixing chamber being adapted to receive fuel/air mixture from said fuel nozzle, said mixing chamber having a distal end and a proximal end, said distal end of said mixing chamber being smaller in cross-sectional area than said proximal end of said mixing chamber, the mixing chamber having an axis and a wall angle relative to said axis within the range 10° to 60°;
 a throat at the distal end of said mixing chamber, said throat having a rounded edge; and
 a diverging section separated from the mixing chamber by said throat, said diverging section having a distal end and a proximal end, said distal end of said diverging section being greater in cross-sectional area than said proximal end of said diverging section, the diverging section having an axis and a wall angle relative to said axis within the range 30° to 80°.

18. The quarl of claim 17, additionally comprising a gas swirler adapted to swirl said fuel/air mixture in said mixing chamber.

19. The quarl of claim 18, wherein the swirler has a swirl number within the range 0.6 to 2.0.

20. A combination nozzle/quarl for a gas turbine combustor, comprising:
 the quarl of claim 17; and
 a nozzle that comprises an endcap that includes a fuel/air exit passage that permits said fuel/air mixture to exit said nozzle, said endcap being adapted to fit within said mixing chamber of said quarl.

21. The combination nozzle/quarl of claim 20, wherein said fuel/air exit passage comprises a plurality of fuel/air exit holes.

22. The combination nozzle/quarl of claim 20, wherein said fuel/air exit passage permits the exit of said fuel/air mixture from said endcap in a generally radial direction away from said endcap.

23. A combination nozzle/quarl for a gas turbine combustor, wherein said nozzle comprises:
 an axially elongate middle tube having a desired diameter and having a distal end and a proximal end, said middle tube being adapted for flow of fuel therethrough;
 a fuel exit passage located circumferentially around the middle tube, near the distal end thereof, so as to permit exit of fuel from said middle tube;
 an axially elongate inner tube having a proximal end and a distal end, said inner tube being adapted for flow of air therethrough, said inner tube having a diameter smaller than the diameter of said middle tube, said inner tube located inside said middle tube; and
 an axially elongate outer tube adapted for flow of air therethrough, said outer tube having a distal end and a proximal end, said outer tube having a diameter greater than the diameter of said middle tube, said middle tube located inside said outer tube, so as to create a space between said middle tube and said outer tube where fuel flowing through said middle tube and air flowing through said inner and outer tubes can mix to form said fuel/air mixture, said endcap being located at the distal end of said outer tube,
and wherein said quarl provides a fuel/air mixture to said gas turbine combustor and comprises:
 a nozzle holder adapted for attachment of a fuel nozzle that supplies said fuel/air mixture;
 a fuel and air mixing chamber with a venturi internal shape, said mixing chamber being adapted to receive fuel/air mixture from said fuel nozzle, said mixing chamber having a distal end and a proximal end, said distal end of said mixing chamber being smaller in cross-sectional area than said proximal end of said mixing chamber;
 a throat at the distal end of said mixing chamber; and
 a diverging section separated from the mixing chamber by said throat, said diverging section having a distal end and a proximal end, said distal end of said diverging section being greater in cross-sectional area than said proximal end of said diverging section.

24. The combination of claim 20, wherein said nozzle comprises an inner tube, a middle tube and an outer tube, said outer tube having a circular-cross section, wherein said endcap is located on said outer tube, wherein the distal end of said quarl is circular, and wherein said distal end of said quarl has a diameter between 1.67 and 4.0 times the diameter of said outer tube.

25. The quarl of claim 17, wherein the distal end of said quarl has a circular cross-section, and wherein said quarl has a length that is between one-fourth to twice the diameter of said distal end.

26. The quarl of claim 17, wherein said throat and said distal end of said quarl both have a circular cross-section, and wherein said throat has an inside diameter of between one-fourth and three-fourths the diameter of the distal end.

27. The nozzle of claim 17, additionally comprising a gas swirler adapted to create axial recirculation of hot products within a reaction zone downstream of said mixing zone.

28. A plain jet radial injection fuel nozzle for a gas turbine combustor, comprising:

an axially elongate middle tube having a distal end and a proximal end, said middle tube being adapted for flow of fuel therethrough;

a fuel exit passage located circumferentially around the middle tube near the distal end thereof;

an axially elongate outer tube adapted for flow of air or gaseous fuel therethrough, said outer tube having a distal end and a proximal end, said middle tube located inside said outer tube, so as to create a space between said middle tube and said outer tube;

an endcap located on the distal end of said outer tube and upstream of a reaction zone, said endcap including a fuel/air exit passage that permits said fuel/air mixture to exit said nozzle; and an axially elongate inner tube having a proximal end and a distal end, said inner tube being adapted for flow of air or gaseous fuel therethrough, such that said endcap is cooled by the flow from the inner tube to prevent thermal breakdown of the endcap caused by thermal radiation from the reaction zone.

29. The nozzle of claim 28, wherein said fuel exit passage permits the exit of fuel from said middle tube in a generally radial direction away from said middle tube.

30. The nozzle of claim 28, wherein said inner tube has a circular cross-section with an outside diameter in the range of about 2 mm to about 20 mm.

31. The nozzle of claim 28, wherein said outer tube has a circular cross-section with an outside diameter in the range of about 1.25 to 4.0 times that of said middle tube.

32. The nozzle of claim 28, wherein said endcap is integral with said outer tube.

33. The nozzle of claim 28, wherein said endcap has a dome-shaped distal end.

34. A method of providing fuel to a gas turbine combustor using a nozzle of the type having an axially elongate inner tube, an axially elongate middle tube, and an axially elongate outer tube, said tubes arranged in concentric fashion such that said inner tube is inside said middle tube and said middle tube is inside said outer tube, each of said tubes having a distal end and a proximal end, said outer tube having at its distal end an endcap that has a fuel/air exit passage thereon, said method comprising:

providing a fuel through said middle tube, such that said fuel exits said middle tube near the distal end thereof;

providing air through each of said inner and outer tubes, such that said air mixes with said fuel exiting said middle tube to create a fuel/air mixture; and permitting said fuel/air mixture to exit said nozzle through said fuel/air exit passage, thereby reversing the air flow from the inner tube to oppose the air flow of the outer tube, and creating shear forces that atomize fuel flow from the middle tube.

35. The method of claim 34, wherein said outer tube has an axis along which said air flows, and wherein said fuel exits said middle tube in a direction perpendicular to the axis of said outer tube.

36. The method of claim 34, wherein said outer tube has an axis along which said air flows, and wherein said fuel/air mixture exits said nozzle in a direction perpendicular to said axis of said outer tube.

37. The method of claim 34, wherein said nozzle is attached to a quarl of the type having a mixing chamber separated from a diverging section by a throat, said method additionally comprising:

providing said fuel/air mixture exiting from said fuel/air exit passage to said mixing chamber;

providing said fuel/air mixture across said throat to said diverging section.

38. The method of claim 37, said method additionally comprising swirling said fuel/air mixture in said mixing chamber.

39. A method of providing fuel to a gas turbine combustor using a nozzle of the type having an axially elongate inner tube, an axially elongate middle tube, and an axially elongate outer tube, said tubes arranged in concentric fashion such that said inner tube is inside said middle tube and said middle tube is inside said outer tube, each of said tubes having a distal end and a proximal end, said outer tube having at its distal end an endcap that has a fuel/air exit passage thereon and which is upstream of a reaction zone, said method comprising:

providing a fuel through said middle tube, such that said fuel exits said middle tube near the distal end thereof;

providing air through each of said inner and outer tubes, such that said air mixes with said fuel exiting said middle tube to create a fuel/air mixture, and such that the air from said inner tube cools said endcap and prevents said endcap from thermal breakdown caused by thermal radiation from said reaction zone; and permitting said fuel/air mixture to exit said nozzle through said fuel/air exit passage.

40. The method of claim 39, wherein said outer tube has an axis along which said air flows, and wherein said fuel exits said middle tube in a direction perpendicular to the axis of said outer tube.

41. The method of claim 39, wherein said outer tube has an axis along which said air flows, and wherein said fuel/air mixture exits said nozzle in a direction perpendicular to said axis of said outer tube.

42. The method of claim 39, wherein said nozzle is attached to a quarl of the type having a mixing chamber separated from a diverging section by a throat, said method additionally comprising:

providing said/air fuel mixture exiting from said fuel/air exit passage to said mixing chamber;

providing said fuel/air mixture across said throat to said diverging section.

* * * * *

UNITED STATES PATENT AND TRADEMARK OFFICE
CERTIFICATE OF CORRECTION

PATENT NO. : 5,477,685

DATED : December 26, 1995

INVENTOR(S) : Samuelsen et al.

It is certified that error appears in the above-identified patent and that said Letters Patent is hereby corrected as shown below:

On the title page:

item [19], on the cover page, the first inventor's last name should read --Samuelsen--

Item [75], on the title page, the first inventor name is misspelled and should be corrected to -- Scott Samuelsen--.

Item [75], on the title page, the third inventor name is misspelled and should be corrected to -- Scott Shaffar--.

Signed and Sealed this

Twenty-third Day of May, 2000

Attest:

Q. TODD DICKINSON

Attesting Officer

Director of Patents and Trademarks